United States Patent
Gotz et al.

(10) Patent No.: US 9,010,103 B2
(45) Date of Patent: Apr. 21, 2015

(54) DEVICE FOR DRIVING WORKING EQUIPMENT OF A COMMERCIAL VEHICLE

(75) Inventors: Manuel Gotz, Ravensburg (DE); Olrik Weinmann, Eriskirch (DE); Mark Mohr, Tettnang (DE); Martin Fellmann, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 784 days.

(21) Appl. No.: 13/316,761

(22) Filed: Dec. 12, 2011

(65) Prior Publication Data

US 2012/0151903 A1 Jun. 21, 2012

(30) Foreign Application Priority Data

Dec. 20, 2010 (DE) .......................... 10 2010 063 568

(51) Int. Cl.
*F16D 31/02* (2006.01)
*A01B 59/00* (2006.01)
*B60K 6/365* (2007.10)
*B60K 6/445* (2007.10)

(52) U.S. Cl.
CPC .................. *A01B 59/00* (2013.01); *B60K 6/365* (2013.01); *B60K 6/445* (2013.01)

(58) Field of Classification Search
CPC .............. Y10S 903/902; Y10S 903/91; B60K 2006/4825; B60K 6/365; B60K 6/445; Y02T 10/70
USPC .......... 60/325, 435, 431; 475/59, 150, 72, 76, 475/83
See application file for complete search history.

(56) References Cited

U.S. PATENT DOCUMENTS

| | | | |
|---|---|---|---|
| 6,038,500 A | 3/2000 | Weiss | |
| 7,008,342 B2 * | 3/2006 | Dyck et al. | ......................... 475/5 |
| 2006/0191359 A1 | 8/2006 | Tarasinski et al. | |
| 2010/0308559 A1 | 12/2010 | Tarasinski et al. | |

FOREIGN PATENT DOCUMENTS

| | | | | |
|---|---|---|---|---|
| DE | 197 10 082 A1 | 10/1998 | | |
| EP | 1 683 407 A1 | 7/2006 | | |
| EP | 1 995 108 A1 | 11/2008 | | |
| WO | WO 2010130284 | * | 11/2010 | ............ B60W 20/00 |

OTHER PUBLICATIONS

German Search Report dated Feb. 24, 2012. pp. 6.

* cited by examiner

*Primary Examiner* — Edward Look
*Assistant Examiner* — Jason Mikus
(74) *Attorney, Agent, or Firm* — Davis & Bujold, P.L.L.C.; Michael J. Bujold

(57) ABSTRACT

A device (1) for driving working equipment (2) which can be connected to an agricultural commercial vehicle. The commercial vehicle has a combustion engine (6) and a generator (9) which can be driven by the combustion engine (6). The commercial vehicle and/or the working equipment (2) have at least a hydraulic pump (5), for the supply of a hydraulic working circuit (3), and a mechanical connection (4), for driving the working equipment (2). At least one hydraulic pump (5) and/or the mechanical connection (4) can be driven electrically and/or mechanically, and can be driven with a controllable rotational speed by way of the power branching.

13 Claims, 5 Drawing Sheets

DEVICE FOR DRIVING WORKING EQUIPMENT OF A COMMERCIAL VEHICLE

This application claims priority from German patent application serial no. 10 2010 063 568.5 filed Dec. 20, 2010.

FIELD OF THE INVENTION

The invention concerns a device for driving working equipment of an agricultural commercial vehicle.

BACKGROUND OF THE INVENTION

Agricultural commercial vehicles or tractors can be equipped with a multitude of different working or planting equipment which are used for different agricultural working functions. The working equipment is generally driven either mechanically or hydraulically, for instance by means of a so-called power take-off shaft, which is driven by the combustion engine of the tractor. Disadvantageous is the dependence of the power take-off shaft rotational speed in relationship to the rotational speed of the motor which does not match the respective optimum rotational speed of the different working equipment.

Therefore, it has already been proposed to electrically drive the working equipment which is connected to the tractor, to disengage the drive rotational speed for the working equipment from the drive rotational speed of the combustion engine of the tractor. Through EP 1 995 108 A1, a device for the electrical supply of planting equipment, coupled to a commercial vehicle, is known. Positioned in the drive train of the tractor is a generator which is driven by an internal combustion engine (referred to herein as a combustion engine), which generates electrical energy that is transferred by means of an electric transmission device to the planting equipment. At least an electric motor is positioned in the planting equipment which performs the agricultural working function, the electric motor receives the electric supply and electrical energy through electric wiring and a plug-in connection at the tractor. The electric power which is applied to the electric motor can be adjusted through the transmission device, thus, the drive rotational speed of the electric motors are independent of the rotational speed of the combustion engine. However, it is a disadvantage that the total drive power for the planting device is induced as by electrical power which creates a decrease of the efficiency, meaning an increased gasoline consumption of the combustion engine of the tractor.

SUMMARY OF THE INVENTION

It is the task of the present invention to achieve, with a device for driving working equipment of an agricultural commercial vehicle of the above mentioned art, on one hand an independent drive rotational speed from the combustion engine for the working equipment, and on the other hand an improvement of the drive efficiency as compared to a pure electrical drive.

It is provided in accordance with the invention that the hydraulic pumps, positioned in the commercial vehicle or with the working equipment, and/or the mechanical connection, either electrically and/or mechanically, can be driven with a controllable rotational speed by means of power branching. The advantage hereby is that high efficiency is achieved through the partial mechanical drive and control of the rotational speed through the electrical drive, due to the power branching.

In a preferred embodiment, the power branching comprises of a mechanical power branch, beginning with the combustion power engine, and an electrical power branch, beginning with the generator, whereby the mechanical and the electrical power branch are combined in a planetary transmission. It is possible by means of the planetary transmission to achieve rotational speed control at the output shaft of the planetary transmission which drives the hydraulic pumps and/or the mechanical connection for the working equipment.

In an additional advantageous embodiment, the electrical power branch comprises at least an electric motor which drives the planetary transmission. The electric motor receives its electric drive energy from the generator, while the mechanical power branch receives its drive energy from the combustion engine. Through the transformation of the electrical drive energy into a mechanical energy via the electric motor and the planetary transmission, a rotational speed adjustment can thus take place.

In an additional, preferred embodiment, the electric power branch has lower power than the mechanical power branch. This results in the advantage of a higher total efficiency for the drive of the working equipment.

In an additional, preferred embodiment, the control of the rotational speed takes place through the control of the electric power branch, meaning the mechanical power which is induced into the planetary transmission by the electric motor. Since there is only a small portion of the total power needed for the adjustment of the output rotational speed of the planetary transmission, this control results in advantages.

In an additional, further embodiment the hydraulic pump for the hydraulic pumps are driven by the planetary transmission. In this case, the drive of the mechanic connection takes place through the mechanical power branch. The advantage hereby is that the rotational speed of the hydraulic pumps which supply the hydraulic working environment can be matched with the respective rotational speed requirement.

In an additional, preferred embodiment, the mechanical connection is driven through the planetary transmission, whereby it results in the advantage of the rotational speed control for the drive of the working equipment, and also, on the other hand, results in a relatively high efficiency because of the mechanical power branch.

In an additional, preferred embodiment, the hydraulic pumps as well as the mechanical connection can be driven by one or two planetary transmissions. In this case, the advantage is that the drive rotational speed of both users can be controlled.

In an additional, preferred embodiment, the generator is designed as an electric machine which can be driven as a generator as well as a motor. The advantage hereby is the recuperation of the braking energy of the commercial vehicle.

In an additional, preferred embodiment, an energy storage device is assigned to the electric machine in which the recuperated braking energy can be stored and used during the drive of the working equipment through the electric power branch, in favor of the combustion engine.

In an additional, preferred embodiment, the combustion power engine and the electric machine in the drive train of the commercial vehicle are positioned in the art of a serial, parallel, or power branching hybrid system. The invented drive device can therefore be combined with the known designs of hybrid systems.

BRIEF DESCRIPTION OF THE DRAWINGS

Examples of the embodiments of the invention are presented in the drawing and are further described in the following, whereby the additional characteristics and/or advantages can result from the specification and/or the drawings. They show.

DETAILED DESCRIPTION OF THE PREFERRED EMBODIMENTS

Figure 1:
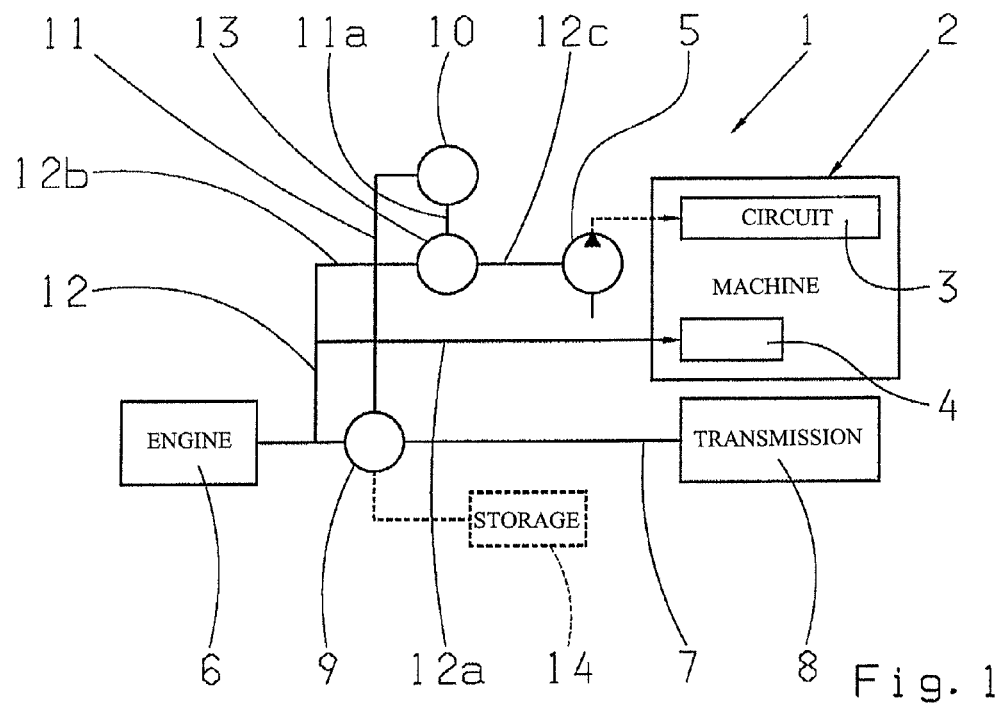
FIG. 1 an invented device to drive the working equipment with power branching.

FIG. 1 shows a device 1 for the drive of a working equipment 2 of an agricultural commercial vehicle, not shown here, called a tractor in the following. The working equipment 2 can be coupled, not shown here, to the tractor and can be exchanged, as required with other working equipment which performs different agricultural working functions. Thus, the connection of the working equipment 2 with the tractor can be detached. The working equipment 2 comprises one or more a hydraulic working circuits, for instance, for actuating lift equipment and for the working equipment itself. In addition the tractor can include a hydraulic circuit for providing the lubrication and system pressure to the transmission and the rear axle of the tractor. A hydraulic circuit is, in the example, marked with the reference number 3. The working equipment also comprises of a mechanical connection 4, for instance designed as a clutch for a mechanical drive of the working equipment 2, whereby the drive takes place preferably through a power take-off shaft of the tractor, not shown here. The hydraulic circuit 3 is supplied through its own hydraulic pump 5.

The tractor has a drive machine which is designed as an internal combustion engine 6, in the following also called combustion engine 6, and is presented schematically. The combustion engine 6 is mechanically connected through a drive train 7 with the transmission 8, through which the wheels of the tractor are driven. A generator 9 is positioned in the drive train 7 between the combustion engine 6 and the transmission 8 for the generation of electrical energy and which supplies an electric motor 10 with electric energy via the electric power branch 11. A mechanical power branch 12 branches off from the drive train 7 and splits into two parallel power branches 12a and 12b, whereby the mechanical power branch 12a drives the working equipment 2 mechanically through the connection 4, and the power branch 12b drives a planetary transmission 13. Otherwise, the planetary gear 13 is driven through a mechanical power branch 11a, which is the output shaft of the electric motor 10. The output shaft of the planetary gear 13 is marked as a mechanical power branch 12c which drives the hydraulic pump 5 for the supply of the hydraulic circuit 3. The transferred power in the electric power branch 11 is preferably smaller than the power which is transferred in the mechanical power branch 12b, so that the amount of mechanical drive power for the pump 5 is larger than the amount of the electric power. The result hereby is a better drive efficiency for the pump 5 and thus relief for the combustion engine 6. Rotational speed control of the output shaft 12c of the planetary transmission 13, or the drive rotational speed of the pump 5, respectively, is possible through the planetary transmission 13. In this case, the electric power, which flows through the electric power branch 11, is controlled and which is brought to the electric motor 10. Thus, the drive rotational speed of the pump 5 can be matched with the rotational speed requirement of the hydraulic circuit 3—or other different circuits.

The generator 9 can also be designed as an electric machine, which can be used as a generator as well as a motor. In this case, an optional electric (shown as dashed line) energy storage device 14 is provided. The energy storage device 14 can absorb, via the transmission 8 and the drive train 7, induced brake energy and can store it. If required, the stored electric energy is passed on to the electric motor 10. The presented drive configuration for the working equipment 2, via an electric power branch 11 and via a mechanical power branch 12, corresponds with a parallel hybrid system.

Figure 2:
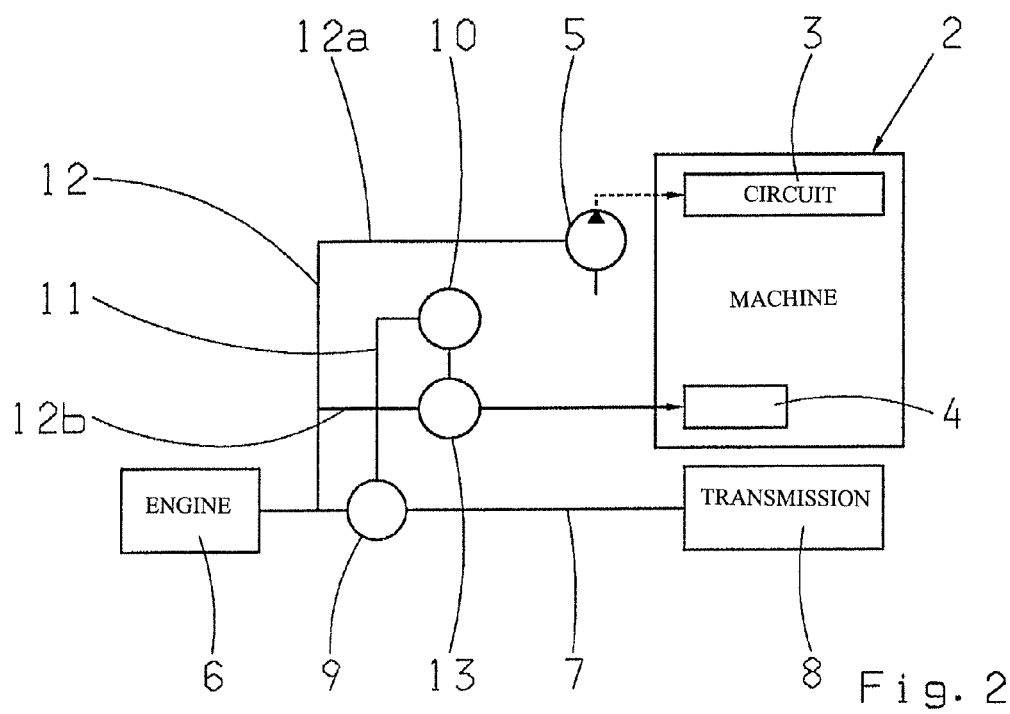
FIG. 2 a second embodiment example of the invention

FIG. 2 shows a second embodiment of the invention with the modified drive configuration for the working equipment 2 (the same reference numbers as in FIG. 1 are used for same parts). In this case, the rotational speed control drive attaches to a mechanical connection 4 of the working equipment 2, while the drive for the pump 5 is a pure mechanical one and not controlled. The mechanical power branch 12 leads through the branch 12a directly to the pump 5. A branch 12b drives into the planetary transmission 13, which is simultaneously mechanically driven by the electric motor 10. The electric motor 10 is supplied with energy through the electric power branch 11 by the generator 9. The branching of the power through the mechanical power branch 12, 12b, and the electric power branch 11 corresponds with the embodiment example in accordance with FIG. 1 but with the difference that the mechanical connection 4 of the working equipment 2 is driven with rotational speed control, while the drive of the pump 5 is dependent on the rotational speed of the combustion engine 6.

Figure 3:
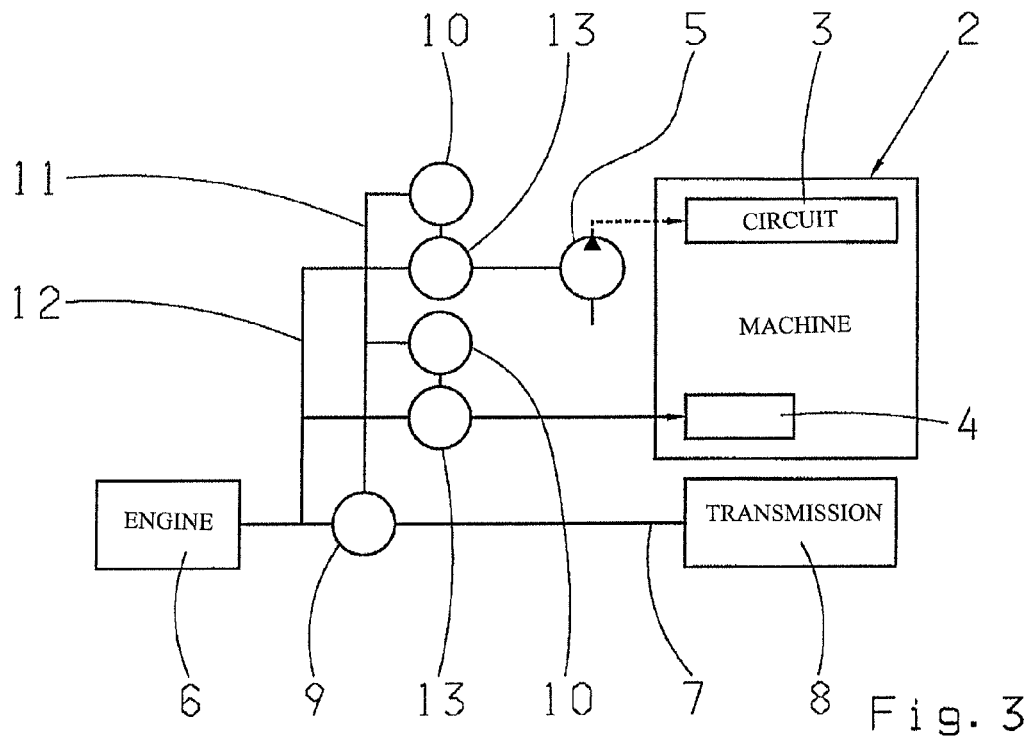
FIG. 3 a third embodiment example of the invention.

FIG. 3 shows a third embodiment example of the invention, whereby the same reference numbers are used for the same parts. The embodiment example in accordance with FIG. 3 shows practically an overlay of the embodiment example in accordance with FIG. 1 and FIG. 2, in which the pump 5 as well as the mechanical connection 4 are driven with rotational speed control, each through power branching. The electric power branch 11 supplies the two electric motors 10 with electric power and the mechanical power branch 12 drives the two planetary transmissions 13. In the present case, it shows therefore double parallel power branching and thus a double rotational speed control, on one hand for the pump 5 and on the other hand for the mechanical connection 4.

Figure 4:
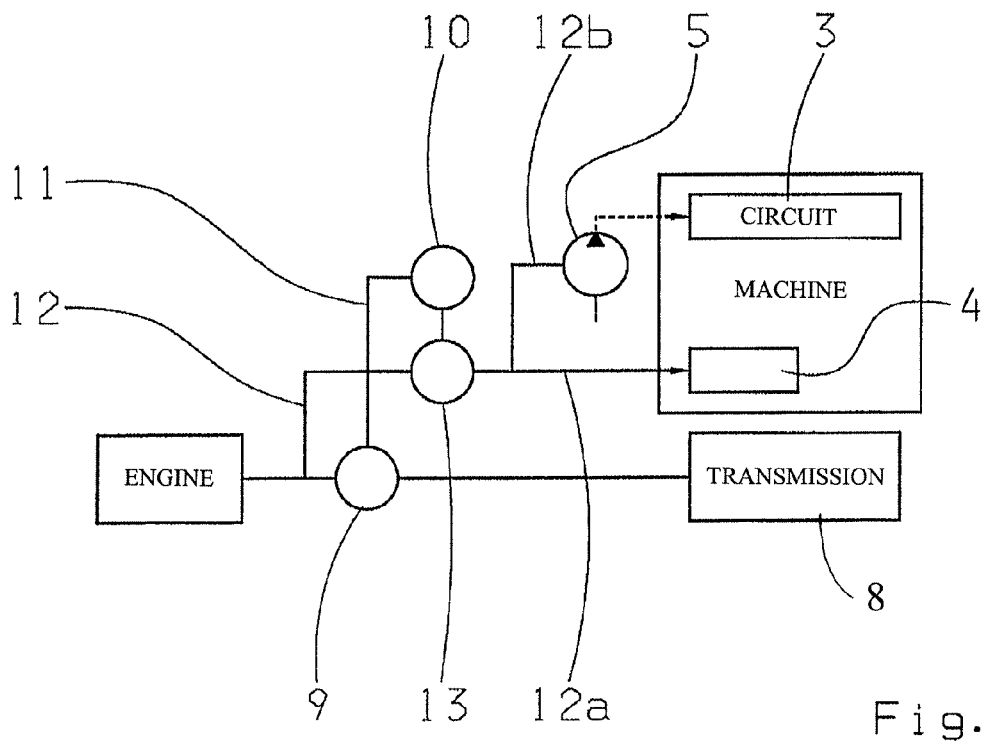
FIG. 4 a fourth embodiment example of the invention.

FIG. 4 shows a fourth embodiment example of the invention with a single power branch: an electric power branch 11, starting from the generator 9, supplies the electric motor 10 with the electric energy, which by itself mechanically drives the planetary transmission 13. The latter, on the other hand, is driven through the mechanical power branch 12. On the output side of the planetary transmission 13, the mechanical power branch splits into a power branch 12a to drive the mechanical connection 4 and into a power branch 12b to drive the hydraulic pump 5. Although in this case both users of the working equipment 2 are driven with rotational speed control, the drive of both users, however, takes place at the same rotational speed. This can be in certain cases sufficient but is based on the design of the working equipment 2.

Figure 5:
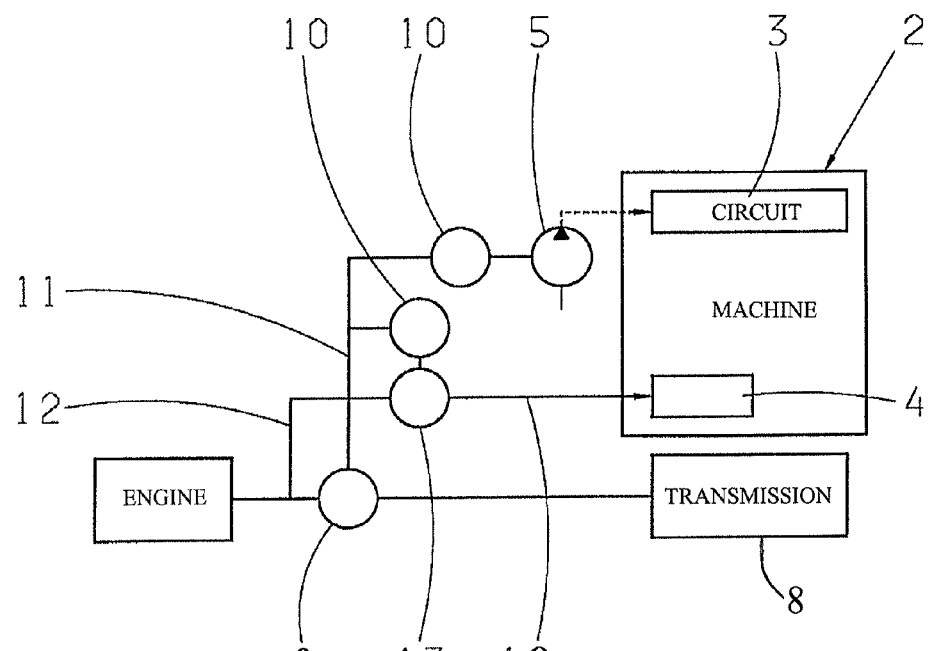
FIG. 5 a fifth embodiment example of the invention.

FIG. 5 shows a fifth embodiment example of the invention with a single power branch for the mechanical connection 4 of the working equipment 2. An electric power branch 11 supplies the first electric motor 10 and a second electric motor 10 with electric energy, whereby the first electric motor 10 drives the planetary transmission 13 and the second electric motor 10 drives the pump 5. A mechanical power branch 12 drives the planetary transmission 13 which is connected at the output through the mechanical power branch 12a with the mechanical connection 4. Rotational speed control takes place at the mechanical connection 4 through the planetary transmission 13, whereby the power of the electric power branch 11 is controllable. Simultaneously, the power of the second electric motor 10 to the drive the pump 5 is controllable.

Figure 6:
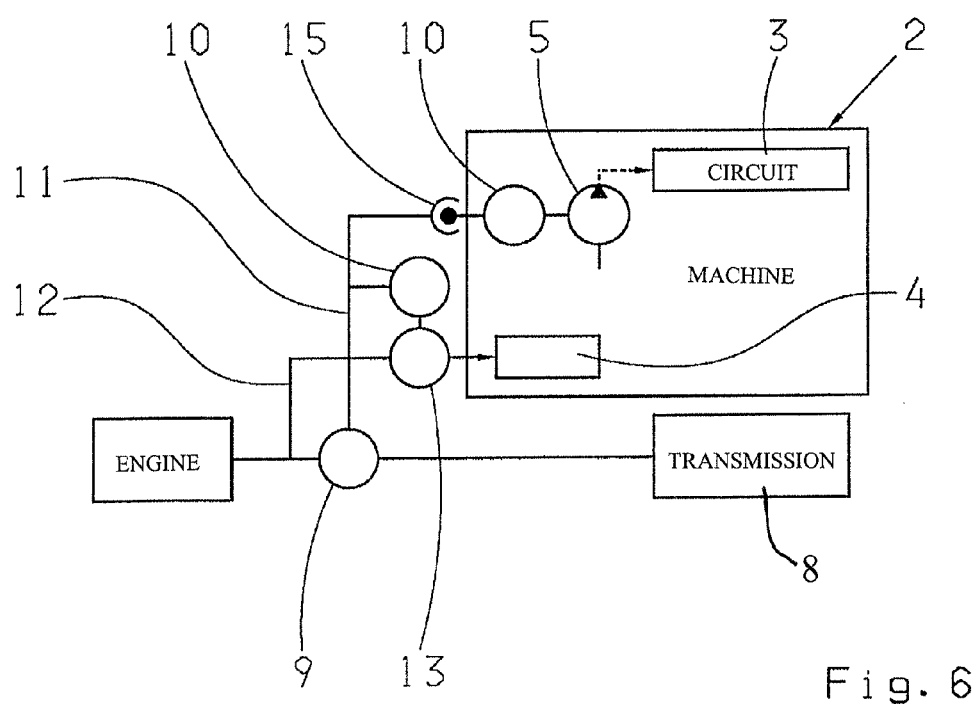
FIG. 6 a sixth embodiment example of the invention.

FIG. 6 shows a sixth embodiment example of the invention. The drive device in accordance with FIG. 6 corresponds with the drive system in accordance with FIG. 5, with the difference being that an interface 15 in FIG. 6, designed as a plug in connection, is provided with the electric power branch 11. The electric motor 10 and the pump 5 are located in the working equipment 2.

Figure 7:
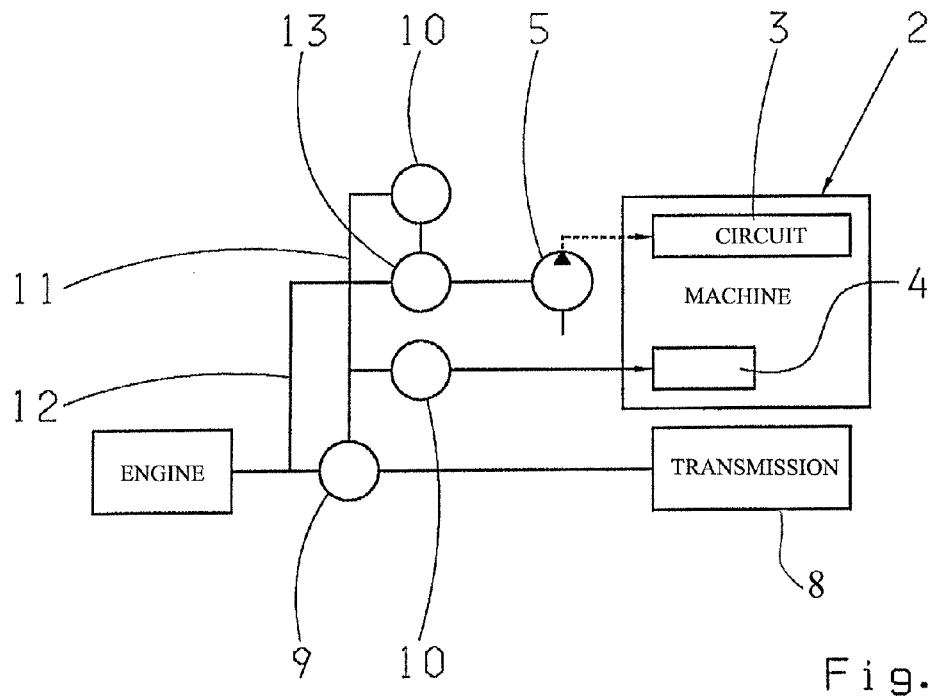
FIG. 7 a seventh embodiment example of the invention.

FIG. 7 shows a seventh embodiment example of the invention with a power branching, rotational speed controlled drive of the hydraulic pump 5 and an electric, rotational speed controlled drive for the mechanical connection 4 of the working equipment 2. The planetary transmission 13, which drives the hydraulic pump 5, is driven on one hand through the electric power branch 11 and the first electric motor 10, and on the other hand through the mechanical power branch 12. The mechanical connection 4 is directly electrically driven through the second electromotor 10, whereby both electric motors 10 are supplied by the electric power branch 11. Rotational speed control can take place through both electric motors 10. The pump 5 is mainly driven mechanically through the power branch 12, the mechanical connection 4, however, is driven fully electrically, meaning serially.

Figure 8:
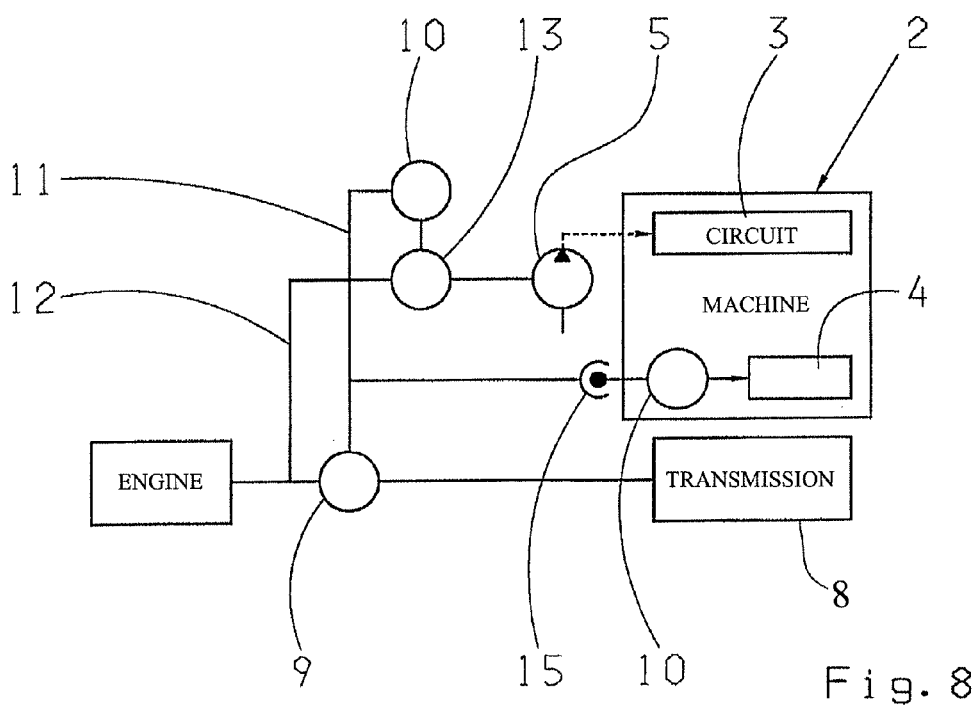
FIG. 8 an eighth embodiment example of the invention.

FIG. 8 shows an eighth embodiment example of the invention which corresponds with the embodiment example in accordance with FIG. 7, with the difference that an interface 15, designed as a plug in connection, is provided and that the electric motor 10 for the mechanical connection 4 is positioned in the working equipment 2.

Figure 9:
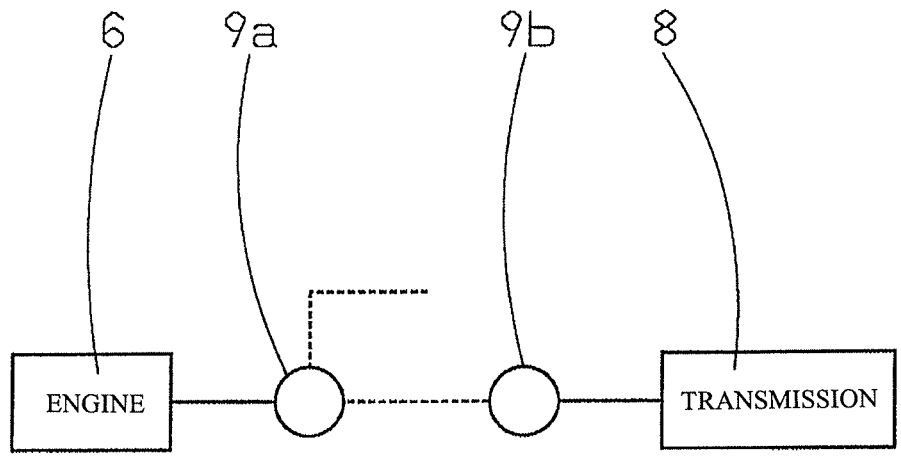
FIG. 9 an alternative design of an electric machine in the drive train as a serial hybrid and FIG. 10 an additional, alternative design of the electric machine in the drive train as a power branching hybrid.

FIG. 9 shows an alternative configuration of a generator 9a and an electric motor 9b between the combustion engine 6 and the transmission 8. The generator 9a is mechanically driven by the combustion engine 6 and supplies the electric motor 9b with the electric power, which mechanically drives the transmission 8. The combustion engine 6 and the transmission 8 are thus mechanically not connected with each other. This drive configuration corresponds with a serial hybrid system. All of the above mentioned embodiment examples can also be combined with such a serial drive system.

Figure 10:
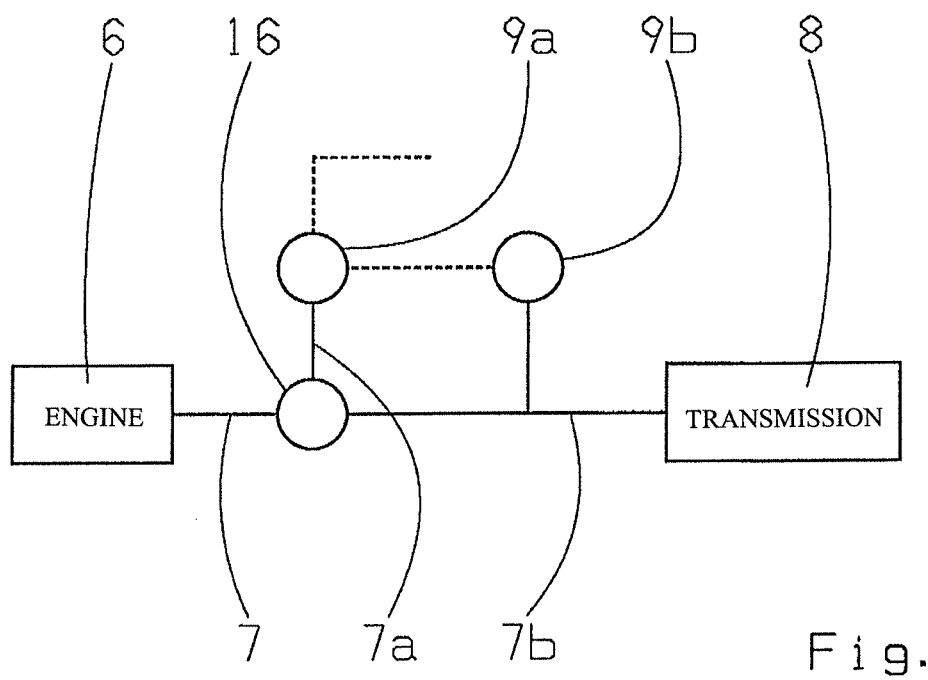

FIG. 10 shows an additional alternative for positioning of the generator 9a and the electric motor 9b in the drive train, between the combustion engine 6 and the transmission 8: a planetary transmission 16, mechanically driven by the combustion engine 6 through the drive train 7, branches the drive power through a first branch 7a towards the generator 9a and through a second branch 7b towards the transmission 8. The generator 9a therefore receives only a portion of the mechanical power provided by the combustion engine 6, the other portion flows towards the transmission 8. This power branching drive train 7, 7a, 7b can also be combined with the above mentioned embodiment examples.

REFERENCE CHARACTERS

1 Drive Device
2 Working Machines
3 Hydraulic Circuit
4 Mechanical Connection (Clutch)
5 Hydraulic Pump
6 Combustion Engine
7 Drive Train
7a First Branch
7b Second Branch
8 Transmission
9 Generator (Electric Machine)
9a Generator
9b Electric Motor
10 Electric Motor
11 Electric Power Branch
11a Mechanical Power Branch
12 Mechanical Power Branch
12a Mechanical Power Branch
12b Mechanical Power Branch
12c Mechanical Power Branch
13 Planetary Transmission
14 Energy Storage
15 Plug-In Connection
16 Planetary Transmission

The invention claimed is:

1. A device for driving working equipment (2) which is connectable to an agricultural commercial vehicle, the device comprising a combustion engine (6) and a generator (9, 9a) which can be driven by the combustion engine (6),
at least one of the commercial vehicle and the working equipment (2) having a hydraulic pump (5), for supplying a hydraulic working circuit (3), and a mechanical connection (4), for driving the working equipment (2), and
the combustion engine being connected to the hydraulic pump for supplying drive thereto and the combustion engine being connected to the mechanical connection for supplying drive thereto,
a planetary transmission being connected between the combustion engine and at least one of the hydraulic pump and the mechanical connection,
an electric motor being connected between the generator and the planetary transmission, the electric motor supplying drive, via the planetary transmission, to the at least one of the hydraulic pump and the mechanical connection,
the planetary transmission being directly connected to each of the electric motor and the combustion engine, the at least one of the hydraulic pump (5) and the mechanical connection (4) being driven electrically and mechanically with a controllable rotational speed.

2. The device according to claim 1, wherein a mechanical power branch (12) is formed by the direct connection between the combustion engine and the planetary transmission, and an electrical power branch (11) is formed by the connection between the generator and the electric motor, a flow of drive along the mechanical power branch and a flow of drive through the electrical power branch join together at the planetary transmission (13).

3. The device according to claim 2, wherein the electrical power branch (11) comprises the electric motor (10) which transmits drive between the generator and the planetary transmission (13).

4. The device according to claim 3, wherein the electric motor (10) is operable as a motor and a generator.

5. The device according to claim 3, wherein the electric power branch (11) has a lower output power than the mechanical power branch (12).

6. The device according to claim 2, wherein a rotational speed control occurs by control of the electric power branch (11).

7. The device according to claim 2, wherein the hydraulic pump (5) is driven by the planetary transmission (13).

8. The device according to claim 2, wherein the mechanical connection (4) is driven by the planetary transmission (13).

9. The device according to claim 2, wherein the hydraulic pump (5) and the mechanical connection (4) are each driven by the planetary transmission (13).

10. The device according to claim 1, wherein the generator (9) is an electric machine which is operable as a generator and as a motor.

11. The device according to claim 10, wherein the electric machine (9, 9a, 9b) has an electrical energy storage (14).

12. The device according to claim 10, wherein the combustion engine (6) and the electric machine (9, 9a, 9b) are arranged one of in series with one another, in parallel with one another and as a power branching hybrid system.

13. A device for driving working equipment (2) which is connectable to an agricultural commercial vehicle which has a drive transmission, the device comprising:

a combustion engine (6) and a generator (9, 9a) which is driven by the combustion engine (6), the generator being connected to the drive transmission via a drive train so as to transmit drive from the combustion engine to the drive transmission, the working equipment (2) comprising a hydraulic circuit (3) and a mechanical drive connection (4), a hydraulic pump (5) supplying the hydraulic circuit (3) with hydraulic fluid, and at least one of the hydraulic pump (5) and the mechanical connection (4) is connected to the combustion engine by an electrical power branch and a mechanical power branch such that the at least one of the hydraulic pump and the mechanical connection is driven electrically and mechanically at a rotational speed that is controllable by power branching, the mechanical power branch comprises a planetary transmission which is directly connected to the combustion engine and the at least one of the hydraulic pump and the mechanical connection, the electrical power branch comprises an electric motor which is directly connected, via the electrical power branch, to the generator and, via a further mechanical power branch, to the planetary transmission.

\* \* \* \* \*